Patented Dec. 6, 1927.

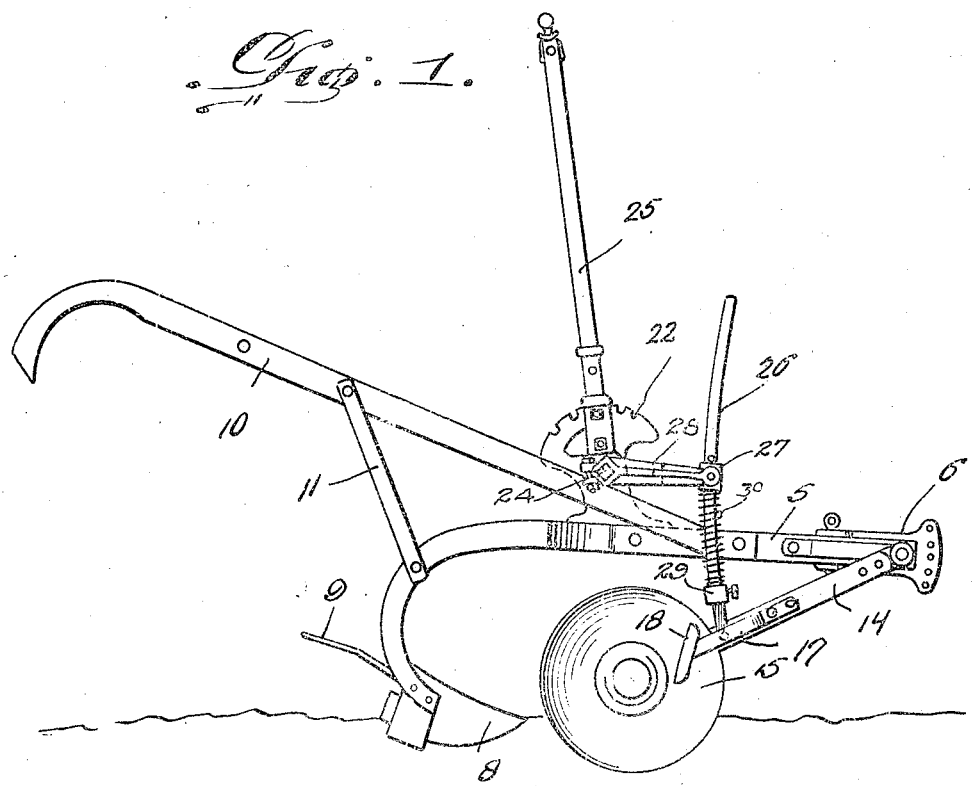
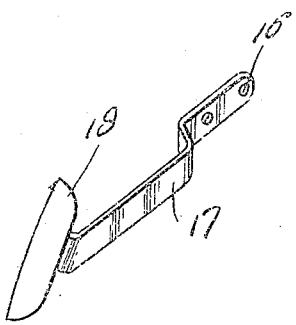

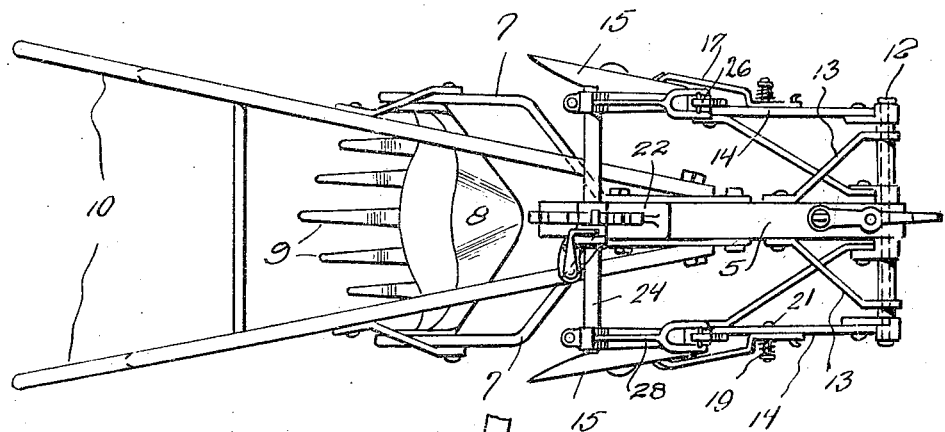
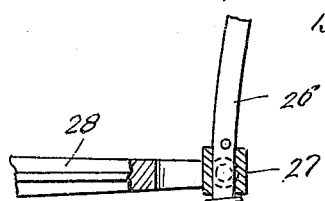
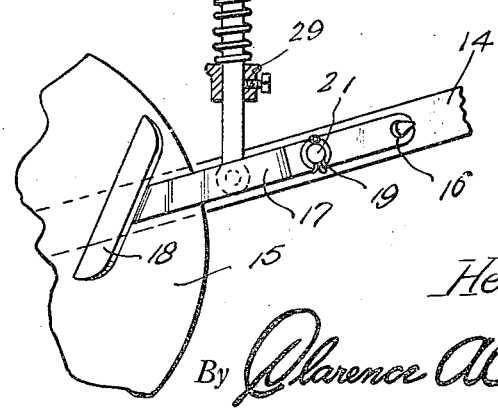

1,651,673

UNITED STATES PATENT OFFICE.

HENRY CLARY, OF PARIS, TENNESSEE.

PLOW.

Application filed May 20, 1926. Serial No. 110,477.

This invention relates to plows of the potato and peanut type and has for its primary object the provision of such an implement that is more efficient and easy of operation as well as cheaper in construction than similar plows now upon the market.

A further object of the invention is to provide such a plow wherein the potato and peanut vines will be readily cut and wherein the potatoes and peanuts will be efficiently turned up but at the same time leaving the ground level and in otherwise good shape, permitting a further crop to be planted after one crop has been removed.

A further object of the invention resides in the provision of means whereby the cutter discs may rise upwardly either jointly or separately so as to compensate for the unevenness of the ground being plowed.

A still further object is to provide simple and efficient means for the raising of said cutting discs in order that the plows may be turned within a small area.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the various views:

Figure 1 is a side elevation of a plow constructed in accordance with my invention.

Figure 2 is a top plan view thereof.

Figure 3 is an enlarged fragmentary view partly in side elevation and partly in cross section for more clearly disclosing the means whereby the cutting discs may be elevated or lowered and whereby the same may be automatically moved upwardly to compensate for the unlevel ground conditions encountered, and Figure 4 is a perspective of one of the disc scraper elements.

Now having particular reference to the drawings, my novel plow constitutes the provision of a substantially horizontal beam 5, upon the front end of which is a conventional draw head 6 in order that the plow may be propelled over the ground by horse or mechanical power. Secured to the rear end of said beam 5 at opposite sides thereof are outwardly and then rearwardly extending arms 7—7 that are curved downwardly at their rear ends and between which downwardly bent ends is a wide and inclined digging shovel 8 secured to or formed upon the rear end of which are spaced shifting fingers 9, for an obvious purpose.

Extending rearwardly and inclined upwardly from the beam 5 are the usual steering handles 10 braced to the arms 7—7 by connecting bars 11.

Extending transversely across the forward end of the beam 5 is a stationary shaft 12 that is braced to the beam 5 by brace bars 13—13. Pivotally secured to the opposite ends of this stationary shaft are rearwardly and normally downwardly extending arms 14—14 upon the free ends of which are rotatively mounted cutting discs 15—15, that are slightly pitched as shown in Figure 2.

Loosely connected to the outer side of each arm 14 is the forward offset end 16 of a rearwardly extending scraper blade carrying arm 17 that extends over the outer side of the respective disc 15 and is equipped with a scraper blade 18 normally maintained in frictional engagement with the outer surface of the disc through reason of an expansible coil spring 19 that surrounds the outer end of a bolt 21 that extends through registering openings in the arms 14 and 17 respectively, Figure 2.

Projecting vertically from the beam 5 at its rear end is a toothed segment 22 through which is journaled a shaft 29 square at its outer end. Adjacent said segment 22 the shaft 24 is provided with an upwardly extending hand lever 25 equipped with a spring detent for cooperation with the teeth of the segment for maintaining said shaft as well as the lever in various positions.

Extending upwardly from each disc carrying arm 14 adjacent the respective disc 15 is a slightly forwardly curved bar 26. This bar is slidable through a suitable collar 27 which is disposed vertically in the forked outer or forward end of the arm 28, the rear end of which is secured to the adjacent end of the cross shaft 24. For the purpose of limiting the downward sliding movement of the bars 26, a suitable pin extends transversely through the upper portion of the bar and the same is adapted to engage the upper edge of the respective collar 27, in the manner as more clearly shown in Figures 1 and 3.

Surrounding each bar 26 between the collar 27 of the respective arm 28 and a collar 29 adjustably disposed upon said bar is an expansible coil spring 30 of relatively great strength for forcing the disc 15 to cut into the ground but permitting the carrying arm therefor to raise upon its pivot so as to compensate for uneven conditions in the ground surface.

It will thus be seen that by moving a plow of this construction along rows of potatoes or peanuts, the earth at opposite sides of the rows will be effectively stirred up by the discs 15 enabling the shovel 8 to engage thereunder for raising the potatoes or peanuts as the case may be. Said discs 15 will also effectively cut the vines permitting of the efficient raising of the peanuts or potatoes thereon. Obviously the discs 15—15 may be raised above the surface of the ground by drawing rearwardly upon the hand lever 25, the detent and segment permitting said discs to be maintained in the desired elevated position.

Having thus described the invention, what I claim as new and desire to secure by Letters Patent is:—

In an agricultural implement of the class described, a beam, a pair of arms pivotally secured at their forward ends to the forward end of the beam on opposite sides thereof, said arm being normally inclined downwardly toward their rear ends, cutting discs journaled for rotation on the rear ends of the respective arms, a bracket extending upwardly from the rear end portion of the beam, a rocker shaft journaled transversely through the bracket, forwardly extending arms secured on the respective ends of the rocker shaft, the outer end of each arm being forked, a vertically disposed collar carried by the outer forked end of each forwardly extending arm, forwardly curved bars extending upwardly from the disc carrying arms, and slidable through the respective collar, said forwardly curved bars having means associated therewith for engagement with the upper edge of the respective collars to limit the downward sliding movement of the bars, said means comprising pins extending transversely through the bars, an additional collar adjustably secured on the lower portion of each bar, an expansible spring encircling each bar and disposed between the adjustable collar thereon and the collar carried by the respective forked arms for maintaining the disc in engagement with the soil, and means for actuating the rocker shaft for raising the disc upwardly out of engagement with the soil.

In testimony whereof I affix my signature.

HENRY CLARY.